(12) United States Patent
Kisaka et al.

(10) Patent No.: US 8,135,285 B2
(45) Date of Patent: Mar. 13, 2012

(54) OPTICAL TRANSMISSION SYSTEM AND METHOD

(75) Inventors: Yoshiaki Kisaka, Yokosuka (JP); Shigeki Aisawa, Yokosuka (JP); Yutaka Miyamoto, Yokosuka (JP); Masahito Tomizawa, Yokosuka (JP); Yasuyuki Endoh, Machida (JP); Kazuhito Takei, Fijisaw (JP)

(73) Assignee: NTT Electronics Corporation, Yokohama-shi, Kanagawa ( * ) Notice: Subject to any disclaimer, the term of this patent is extended or adjusted under 35 U.S.C. 154(b) by 807 days.

(21) Appl. No.: 12/096,551

(22) PCT Filed: Dec. 21, 2006

(86) PCT No.: PCT/JP2006/325531
§ 371 (c)(1),
(2), (4) Date: Jun. 6, 2008

(87) PCT Pub. No.: WO2007/072921
PCT Pub. Date: Jun. 28, 2007

(65) Prior Publication Data
US 2009/0162061 A1     Jun. 25, 2009

(30) Foreign Application Priority Data
Dec. 22, 2005   (JP) .................................. 2005-369896

(51) Int. Cl.
*H04B 10/00* (2006.01)
(52) U.S. Cl. ............ 398/182; 398/154; 398/192; 398/72
(58) Field of Classification Search .......... 398/140–141, 398/154–155, 182–201
See application file for complete search history.

(56) References Cited

U.S. PATENT DOCUMENTS

| | | | | |
|---|---|---|---|---|
| 4,596,026 | A | * | 6/1986 | Cease et al. .................... 375/372 |
| 5,020,057 | A | * | 5/1991 | Taniguchi et al. ............. 370/506 |
| 5,030,951 | A | | 7/1991 | Eda et al. |
| 5,331,630 | A | * | 7/1994 | Fujita et al. .................... 370/351 |
| 5,357,515 | A | * | 10/1994 | Muroi ............................ 370/276 |
| 5,459,782 | A | * | 10/1995 | Volejnik ........................ 375/372 |
| 5,642,357 | A | * | 6/1997 | Suzuki et al. ................. 370/505 |
| 5,666,351 | A | * | 9/1997 | Oksanen et al. .............. 370/474 |

(Continued)

FOREIGN PATENT DOCUMENTS
EP        1043856 A2    10/2000
(Continued)

OTHER PUBLICATIONS

Office Action issued in corresponding Chinese Patent Apln. No. 200680046363 dated Feb. 1, 2011.

*Primary Examiner* — Agustin Bello
(74) *Attorney, Agent, or Firm* — Fitch, Even, Tabin & Flannery, LLP

(57) ABSTRACT

An optical transmission system for performing frequency synchronization even with a client signal with low frequency accuracy, and for transmitting thereof by accommodating/multiplexing without causing a bit slip. A new overhead is added to the entire client signal, and the signal including the new overhead being stuffed is transmitted in conjunction with a plurality of stuffing bits as an optical signal wherein a data storing bit for a negative stuffing, a stuffing information notification bit, and a stuff bits inserting bit for a positive stuffing in the payload are defined in plurality as stuffing bits for adjusting clock frequencies of the client signal in this new overhead.

3 Claims, 8 Drawing Sheets

U.S. PATENT DOCUMENTS

| | | | |
|---|---|---|---|
| 5,757,871 A | 5/1998 | Furukawa et al. | |
| 5,777,998 A * | 7/1998 | Traverso et al. | 370/509 |
| 5,870,403 A * | 2/1999 | Egoshi | 370/503 |
| 6,014,708 A | 1/2000 | Klish | |
| 6,188,685 B1 * | 2/2001 | Wolf et al. | 370/378 |
| 6,339,628 B1 | 1/2002 | Yoshida | |
| 6,415,006 B2 * | 7/2002 | Rude | 375/372 |
| 7,180,914 B2 * | 2/2007 | Walker et al. | 370/505 |
| 7,286,487 B2 * | 10/2007 | Perkins et al. | 370/253 |
| 7,369,578 B2 * | 5/2008 | Roberts et al. | 370/506 |
| 7,372,862 B2 * | 5/2008 | Wego et al. | 370/412 |
| 7,443,888 B2 * | 10/2008 | Surek | 370/503 |
| 7,555,008 B2 * | 6/2009 | Jorgenson et al. | 370/466 |
| 7,583,664 B2 * | 9/2009 | Ho et al. | 370/386 |
| 7,684,399 B2 * | 3/2010 | Perkins et al. | 370/391 |
| 7,769,051 B2 * | 8/2010 | Perkins et al. | 370/481 |
| 2002/0027929 A1 * | 3/2002 | Eaves | 370/505 |
| 2005/0286521 A1 * | 12/2005 | Chiang et al. | 370/389 |
| 2007/0116061 A1 * | 5/2007 | Meagher et al. | 370/503 |
| 2008/0037984 A1 * | 2/2008 | Perkins et al. | 398/43 |
| 2008/0044183 A1 * | 2/2008 | Perkins et al. | 398/58 |
| 2009/0162061 A1 * | 6/2009 | Kisaka et al. | 398/52 |

FOREIGN PATENT DOCUMENTS

| | | |
|---|---|---|
| JP | 04-196937 A | 7/1992 |
| JP | 05-014304 A | 1/1993 |
| JP | 05-244111 A1 | 9/1993 |
| JP | 8-172413 A | 7/1996 |
| JP | 09-247118 A | 9/1997 |
| JP | 2000-341233 A | 12/2000 |
| JP | 2002-217940 A | 8/2002 |
| JP | 2002-247073 A | 8/2002 |
| JP | 2004-517575 A | 6/2004 |
| JP | 2004-289326 A | 10/2004 |

* cited by examiner

OPTICAL TRANSMISSION SYSTEM AND METHOD

CROSS-REFERENCE TO RELATED APPLICATION

This application is a national phase of PCT Application No. PCT/JP2006/325531, filed on Dec. 21, 2006, which claims the benefit of Japanese Application No. 2005-369896, filed on Dec. 22, 2005.

TECHNICAL FIELD

The present invention relates to an optical transmission system for performing frequency synchronization of a client signal with a large clock frequency deviation and for transmitting thereof by accommodating/multiplexing.

BACKGROUND ART

SDH (Synchronous Digital Hierarchy) is internationally standardized for the optical transmission system as a digital hierarchy for multiplexing the conventional service signals. In the United States, SONET (Synchronous Optical Network) similar to SDH has become a de facto standard. An optical transmission system based on the SONET/SDH specification is the mainstream of the current optical transmission system which hitherto has been widely introduced throughout the world.

In recent years, provided wavelength multiplex transmission (WDM) system capable of corresponding to the explosive growth of the Internet traffic, an Optical Transport Network (OTN) (Nonpatent Document 1) is standardized as a platform transparently transmitting various client such as not only SDH/SONET but also ATM, Ethernet (trademark), and thereby likely to become the mainstream of the future optical transmission system.

Similar to SONET/SDH, the bit rate (clock frequency accuracy) in the OTN is defined as ±20 ppm, and the bit rate in the payload region accommodating the client signal is also defined as ±20 ppm. When the clock of the client signal and the clock of the OTN signal (transmission path side) are asynchronous, the difference in the bit rate causes a phase shift between the client clock and the OTN clock, thereby brings about occurrence of a bit slip. In order to prevent this bit slip, stuffing is implemented in the OTN.

FIG. 1 shows a frame structure of the OTN. In an overhead of an Optical Channel Payload Unit (OPU) in the OTU frame are, a stuffing control byte (Justification Control byte), a byte for inserting stuffing byte for a positive stuffing, and a data storing byte for a negative stuffing are defined. If the bit rate of the client signal and the bit rate of the payload region are not identical, positive or negative stuffing corresponding to their difference is implemented and frequency synchronization of the client signal is achieved. With this process, a number of clients can be time-division multiplexed and a clock accuracy can be kept within the clock accuracy of the OTN standard.

The frequency range capable of frequency synchronization of the client signal is determined according to the rate of the stuffing byte to the payload region byte in the frame. In the case of the OTN frame, stuffing byte of 1 byte is defined relative to the OPU payload region of 4×3808 byte, and frequency difference up to the maximum of ±65 ppm can be absorbed. However, considering the frequency accuracy of the OPU payload at ±20 ppm, the client signal up to a frequency accuracy of ±45 ppm can be accommodated without causing a bit slip.

Non-patent Document 1: ITU-T G. 709

DISCLOSURE OF THE INVENTION

An Ethernet signal has increased its speed with an explosive growth of the Internet which currently standardized as a 10 Gbit/sEthernet (10 GbE) and its installation has been started. The 10 GbE is expected to become a mainstream as a client signal of a communication carrier in the future. Further, the demand has been increasing for connecting LAN environment scattered over distant locations with LAN-PHY as it is. This frequency accuracy of the 10 GbE LAN-PHY is different from such as SONET/SDH and defined as ±100 ppm. These differences defined for the frequency accuracy will cause problems when accommodating the 10 GbE LAN-PHY in the OTN network of the communication carrier.

When the OTN clock is kept within the defined amount of ±20 ppm, the positive/negative stuffing using an OPU overhead allow the frequency difference of the client signal to be absorbed only up to ±45 ppm and cause problem of a bit slip occurrence. Further, if the OTN clock frequency is adjusted or the client signal is synchronized to avoid the bit slip occurrence, the problem of failure in maintaining the OTN clock frequency accuracy within the defined amount of ±20 ppm would be caused.

The object of the present invention is to realize an optical transmission system performing frequency synchronization even with a client signal with low frequency accuracy such as the 10 GbE LAN-PHY, and capable of transmitting thereof by accommodating/multiplexing without causing a bit slip.

In order to attain the above object, a first aspect of the present invention provides an optical transmitter for accommodating the client signal to be transmitted as an optical signal. The optical transmitter provides means for adding new overheads to the entire client signals and means for transmitting the signals including new overheads, in which a couple of stuffing bits are cooperated, wherein data storing bits for negative stuffing and stuffing information notification bits in the overhead area, and bits for positive stuffing in the payload area are defined in plurality as stuffing bits for adjusting clock frequencies of the client signal.

In one embodiment of the optical transmitter of the present invention, the optical transmitter provides means for using the overhead bits in the frame which has various multiplexed layers, as a plurality of stuffing bits.

In one embodiment of the optical transmitter of the present invention, the optical transmitter provides means for using justification bytes in the OPU overhead bytes of various multiplexed layers, which are included in ODU multiplexing in Optical Transport Network (OTN), as the overhead bytes in the frame which has various multiplexed layers. Accordingly, the operation in conjunction with the stuffing bytes being defined in the overhead of different multiplexed layers allows expansion of a frequency range capable of accommodating in the OTN network without causing a bit slip.

In one embodiment of the optical transmitter of the present invention, the optical transmitter provides means for using upper layer's over head bytes in the frame which has various multiplexed layers for precise stuff processing in the lower layer to absorb the clock frequency difference.

In one embodiment of the optical transmitter of the present invention, the optical transmitter provides means for using lower layer's overhead bytes in the frame which has various multiplexed layers for precise stuff processing in the lower layer to absorb the clock frequency difference.

In another embodiment of the optical transmitter of the present invention, the optical transmitter provides means for using the same layer's overhead bytes in the frame which has various multiplexed layers, as a plurality of stuffing bits.

In yet another embodiment of the optical transmitter of the present invention, the optical transmitter provides clock frequency difference detection means for detecting the clock frequency difference between the client side and the transmission path side in the optical transmitter, and means for sharing the stuff processing of a plurality of stuffing bits in accordance with the frequency difference detected by the clock frequency difference detection means. Accordingly, the stuffing corresponding to the detected frequency difference can prevent over-insertion of the stuff, realize a stable stuffing, and prevent a destuff jitter accompanied by destuffing.

In yet another embodiment, the optical transmitter provides means for stuffing corresponding to the remaining capacity of the FIFO for data transition from the client side clock to the transmission path side clock. This allows absorption of an error from the clock frequency difference detection.

In yet another embodiment, the optical transmitter provides the clock frequency difference detection means detects frequency difference by comparing counted numbers of divided clocks between the client side and the transmission path side, including means for detecting multiple clock frequency differences with different clock division ratios to be used for comparing the counted numbers, and means for detecting the clock frequency difference among multiple frequencies with different clock frequency ratios. This allows for a reduction in detection time while retaining the frequency difference detection accuracy.

In another embodiment of the optical transmitter of the present invention, the optical transmitter provides means for sharing the stuff processing of a plurality of stuffing bits corresponding to the remaining capacity of the FIFO for the data transition from the client side clock to the transmission path side clock.

In another embodiment, the optical transmitter provides means for sharing the stuff processing of a plurality of stuffing bits corresponding to relationships between the remaining capacities of the FIFO in the different multiplexed layers.

In another embodiment, the optical transmitter provides one FIFO for multiplexing process of layers, and means for sharing the stuff processing of a plurality of stuffing bits corresponding to the remaining capacity of the one FIFO. This allows to avoid additional circuits such as frequency counters, and to facilitate hardware configuration.

In yet another embodiment of the optical transmitter of the present invention, the optical transmitter provides means for performing the positive stuff processing using some portions of a plurality of overheads, and performing the negative stuff processing using another portions of a plurality of overheads at substantially the same time. When the client signal has no frequency difference or has a small frequency difference, the positive stuffing in portion of a plurality of overheads and negative stuffing in another portion (or all) is performed at substantially the same time to achieve frequency synchronization, and thereby the frequency of stuffing can be increased and the frequency for the destuff jitter occurring at a receiving side can be set out-of-band of a PLL circuit.

In another embodiment of the optical transmitter of the present invention, the optical transmitter provides means for accommodating the client signal transparently including the overhead of the client signal.

A second aspect of the present invention provides an optical receiver for receiving an optical signal generated with an optical transmitter which accommodates the client signal and transmits thereof as an optical signal, the optical transmitter. The optical transmitter provides means for adding new overheads to the entire client signal, and means for transmitting the signals including new overheads, in which a couple of stuffing bits are cooperated, wherein data storing bits for negative stuffing and stuffing information notification bits in the overhead area, and bits for positive stuffing in the payload area are defined in plurality as stuffing bits for adjusting clock frequencies of the client signal. The optical receiver provides means for converting into the client signal by elimination of the new added overheads, and by destuffing corresponding to the referenced stuff information notification bits defined in the new overhead.

A third aspect of the present invention provides an optical transmission system comprising an optical transmitter for accommodating the client signal and transmitting thereof as an optical signal and an optical receiver. The optical transmitter provides means for adding new overheads to the entire client signal, and means for transmitting the signals including new overheads, in which a couple of stuffing bits are cooperated, wherein data storing bits for negative stuffing and stuffing information notification bits in the overhead area, and bits for positive stuffing in the payload area are defined in plurality as stuffing bits for adjusting clock frequencies of the client signal. The optical receiver provides means for receiving the optical signal generated by the optical transmitter, and converting into the client signal by elimination of the new overheads, and by destuffing corresponding to the referenced stuff information notification bits defined in the new overhead.

A fourth aspect of the present invention provides a signal conversion circuit for converting from a client signal format to an optical transmitted signal format. The signal converting circuit provides means for adding new overheads to the entire client signals, and means for generating transmission signals with new overheads, in which a couple of stuffing bits are cooperated, wherein data storing bits for negative stuffing and stuffing information notification bits in the overhead area, and bits for positive stuffing in the payload area are defined in plurality as stuffing bits for adjusting clock frequencies of the client signal. The signal converting circuit corresponds to the new OH applying section hereinafter described in the embodiment of the present invention.

A fifth aspect of the present invention provides an optical transmission method performed in the optical transmission system comprising an optical transmitter for accommodating the client signal and transmitting thereof as an optical signal, and an optical receiver. The optical transmitter provides a step of adding new overheads to the entire client signal, a step of defining a data storing bits for negative stuffing and stuffing information notification bits in the overhead area, and bits for positive stuffing in the payload area in plurality as stuffing bits for adjusting clock frequencies of the client signal in the new overhead, and a step of transmitting the signal including new overheads in which a couple of stuffing bits are cooperated. The optical receiver provides a step of receiving the optical signals and converting into the client signal by elimination of the new overheads, and by destuffing corresponding to the referenced stuffing information notification bits defined in the new overhead.

The present invention allows frequency synchronization by stabilizing the client signals with low frequency accuracy such as 10 GbE LAN-PHY, and allows transmission by accommodating/multiplexing without causing a bit slip.

BEST MODE FOR CARRYING OUT THE INVENTION

First Embodiment

Figure 1:
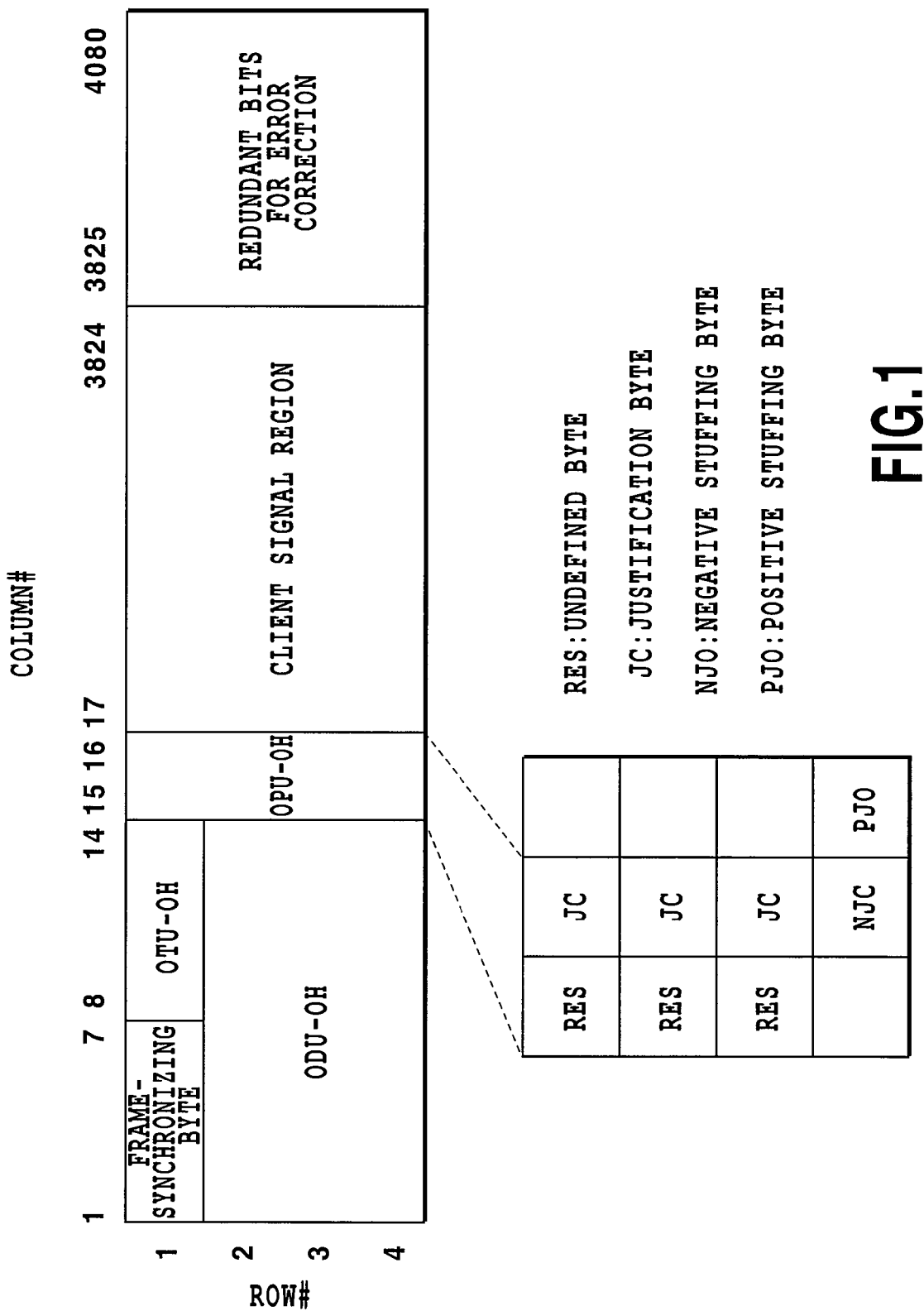
FIG. 1 shows a frame structure of the related art.
Figure 2:
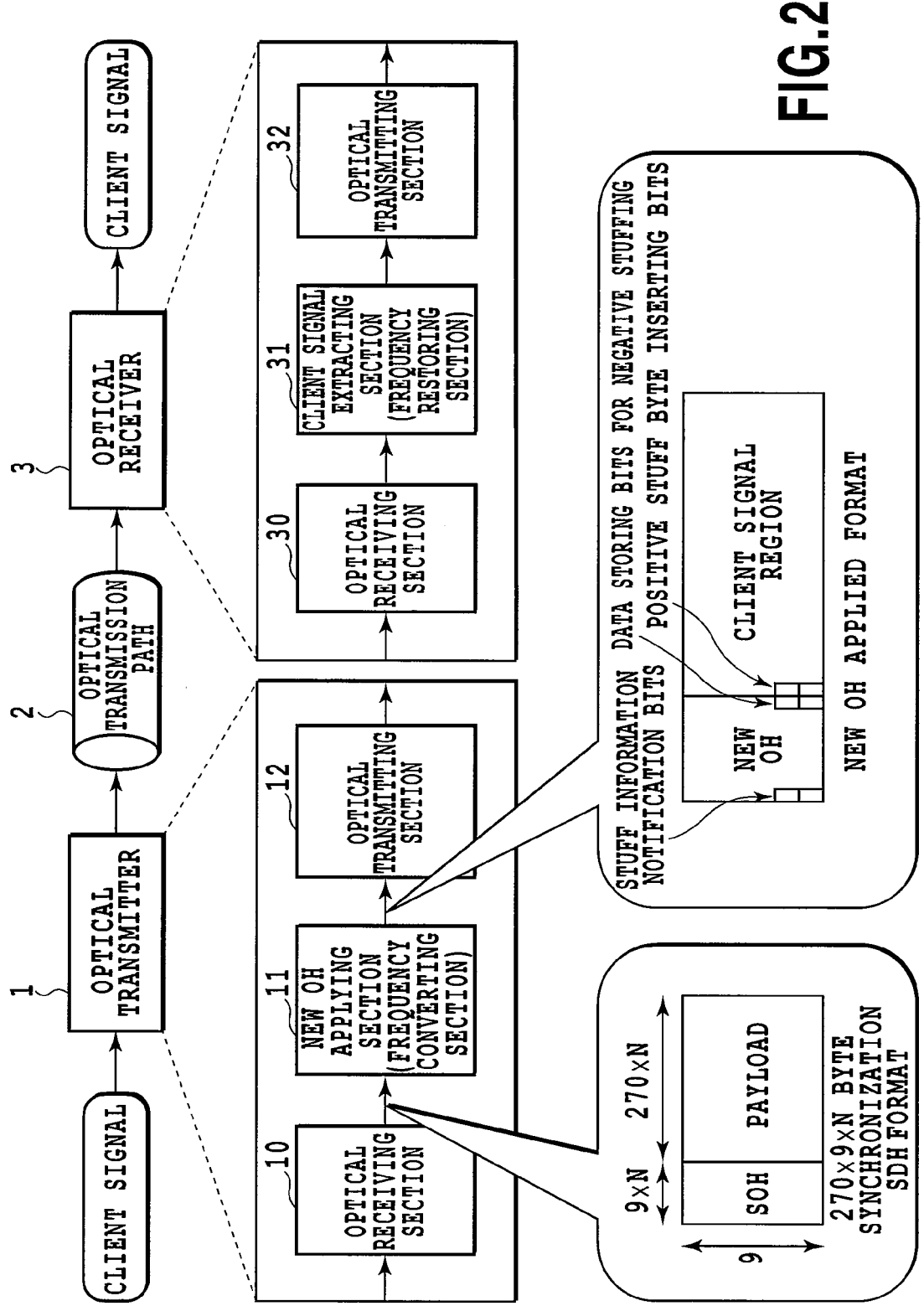
FIG. 2 shows an optical transmission system in accordance with an embodiment of the present invention.

The first embodiment of the present invention will be described with reference to FIG. 2. FIG. 2 shows an optical transmission system in accordance with an embodiment of the present invention. The optical transmitter 1 includes an optical receiving section 10, a new OH applying section 11, and an optical transmitting section 12. The optical receiver 3 includes an optical receiving section 30, a client signal extracting section 31, and an optical transmitting section 32. The optical transmitter 1 and the optical receiver 3 are connected by a transmission path 2.

The present embodiment shows an example of a system accommodating and transmitting an SDH signal as a client signal. In the new OH applying section of the optical transmitter 1, a new overhead (hereinafter abbreviated as new OH) is added to the client signal and a new format is generated. Upon this event, a plurality of stuffing bytes defined in the new OH are used in conjunction therewith and thus the frequency difference of the client signal can be absorbed.

In particular, frequency synchronization can be achieved by inserting stuff bits into a positive stuff byte inserting bits when the bit rate of the client signal is lower than the bit rate of the client signal region in the new format, and by inserting the client signal data into a negative stuff data storing bits when the bit rate of the client signal is higher.

The use of a plurality of stuffing byte permits frequency synchronization over a wide range. In the client signal extracting section 31 of the optical receiver 3, the new OH is eliminated. At the same time, the stuffing information notification bits in this new OH is referenced, data extraction and frequency restoration of the client signal are performed by the corresponding destuffing, and the client signal is outputted. The new OH can be added not only at front/back of the client signal region but also added therebetween. Further, the client signal is not limited to the SDH signal, but may also include, for example, a 10 Gbit/sEthernet signal.

Second Embodiment

Figure 3:
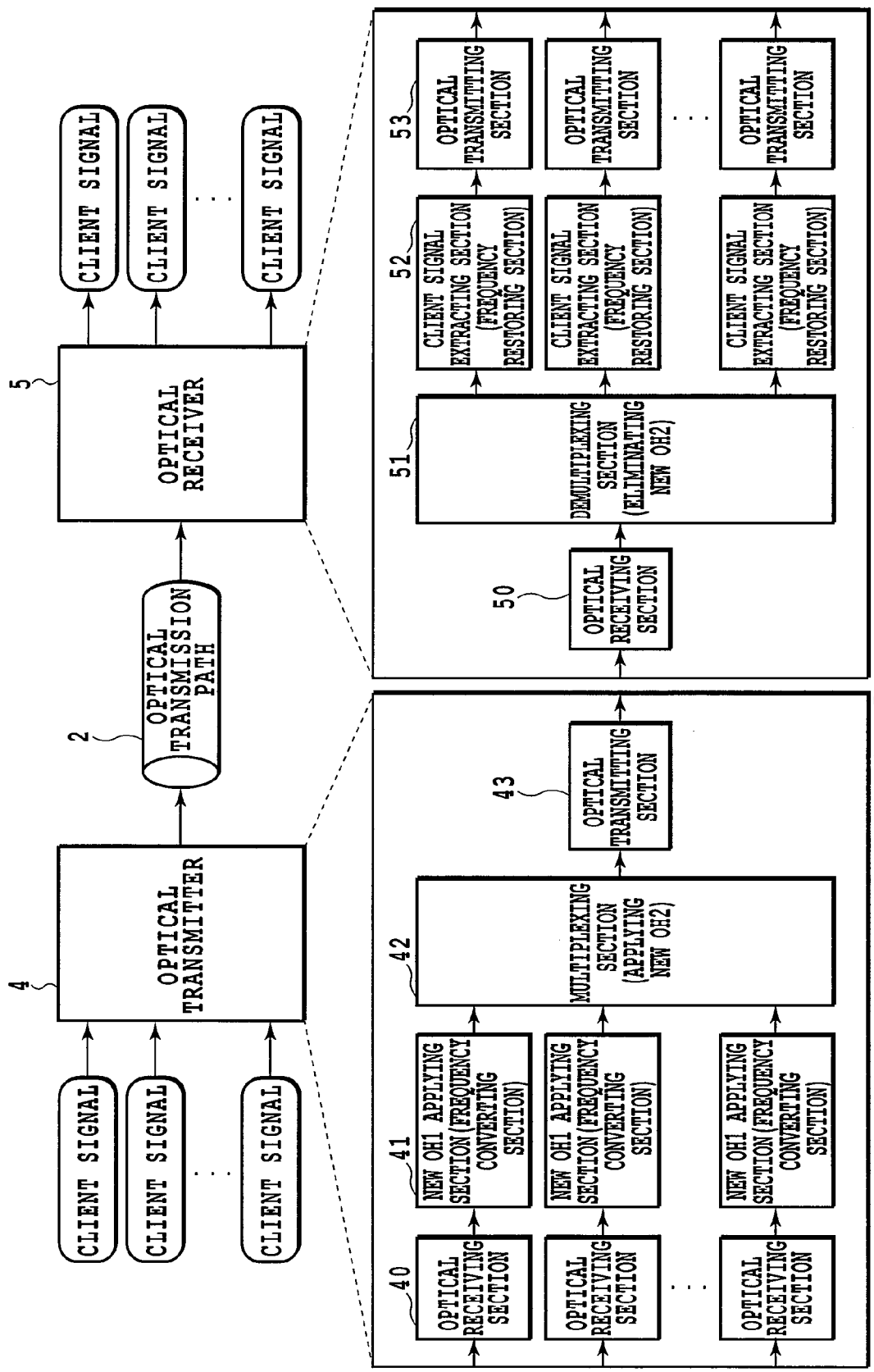
FIG. 3 shows an optical transmission system in accordance with an embodiment of the present invention.

The second embodiment of the present invention will be described with reference to FIGS. 3 and 5. FIG. 3 shows an optical transmission system in accordance with an embodiment of the present invention. An optical transmitter 4 includes an optical receiving section 40, a new OH applying section 41, a multiplexing section 42, and an optical transmitting section 43. An optical receiver 5 includes an optical receiving section 50, a demultiplexing section 51, a client signal extracting section 52, and an optical transmitting section 53. The optical transmitter 4 and the optical receiver 5 are connected by the optical transmission path 2.

The present embodiment shows an example of a system accommodating, multiplexing, and transmitting a plurality of client signals. In the present embodiment of the system, a new OH is added in each multiplexed layer and a new format is generated during the process for multiplexing the client signal by the multiplexing section 42. Upon this event, frequency synchronization can be achieved by using the stuffing byte defined by each OH.

Figure 4:
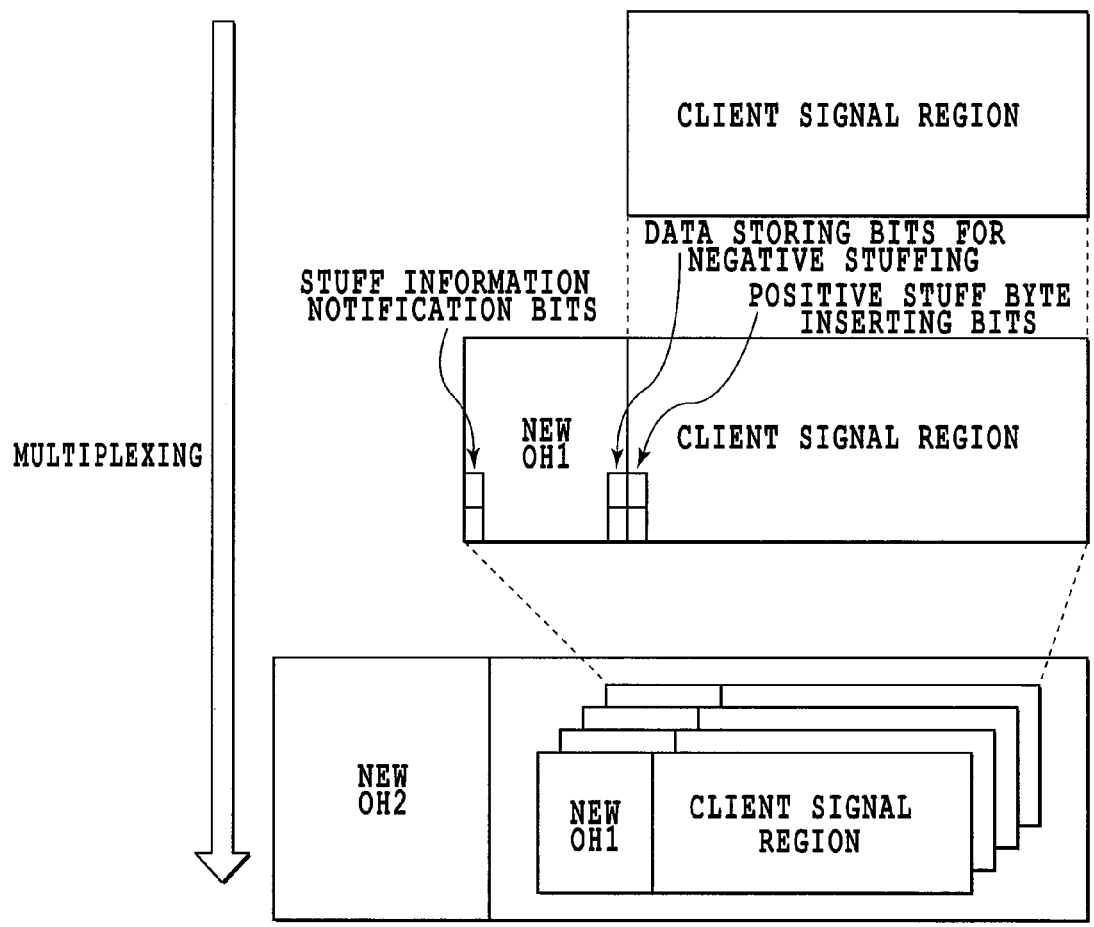
FIG. 4 shows an example of a multiplexed frame structure in the case of multiplexing four client signals in accordance with the present invention.

FIG. 4 shows an example of a multiplexed frame structure in the case of multiplexing four client signals. The coordination of the stuffing in each multiplexed layer allows accommodation of the client signal with wide frequency range without causing a bit slip.

In particular, when the bit rate of the client signal is lower than the bit rate of the client signal region in the new format including the new OH1, frequency synchronization can be achieved by inserting stuff bits into a positive stuff byte inserting bits in the multiplexed layer corresponding to the new OH1. Additionally or alternatively, in the multiplexed layer corresponding to the new OH2 where a plurality of the multiplexed layer corresponding to the new OH1 are to be multiplexed, frequency synchronization can also be achieved by inserting stuff bits of the client signal into the positive stuff byte inserting bits.

When the bit rate of the client signal is higher, frequency synchronization can be similarly achieved by inserting the client signal data into a negative stuffing data storing bits in the multiplexed layers corresponding to the new OH1 and/or the new OH2. Alternatively, when the bit rate of the client signal is higher, the frequency synchronization can also be achieved by inserting the client signal data into the negative stuffing data storing bits in the multiplexed layer corresponding to the new OH1 and/or by inserting the multiplexed layer data (i.e., the new OH1 data and the client signal data) corresponding to the new OH1 into the negative stuffing data storing bits in the multiplexed layer corresponding to the new OH2.

Figure 5:
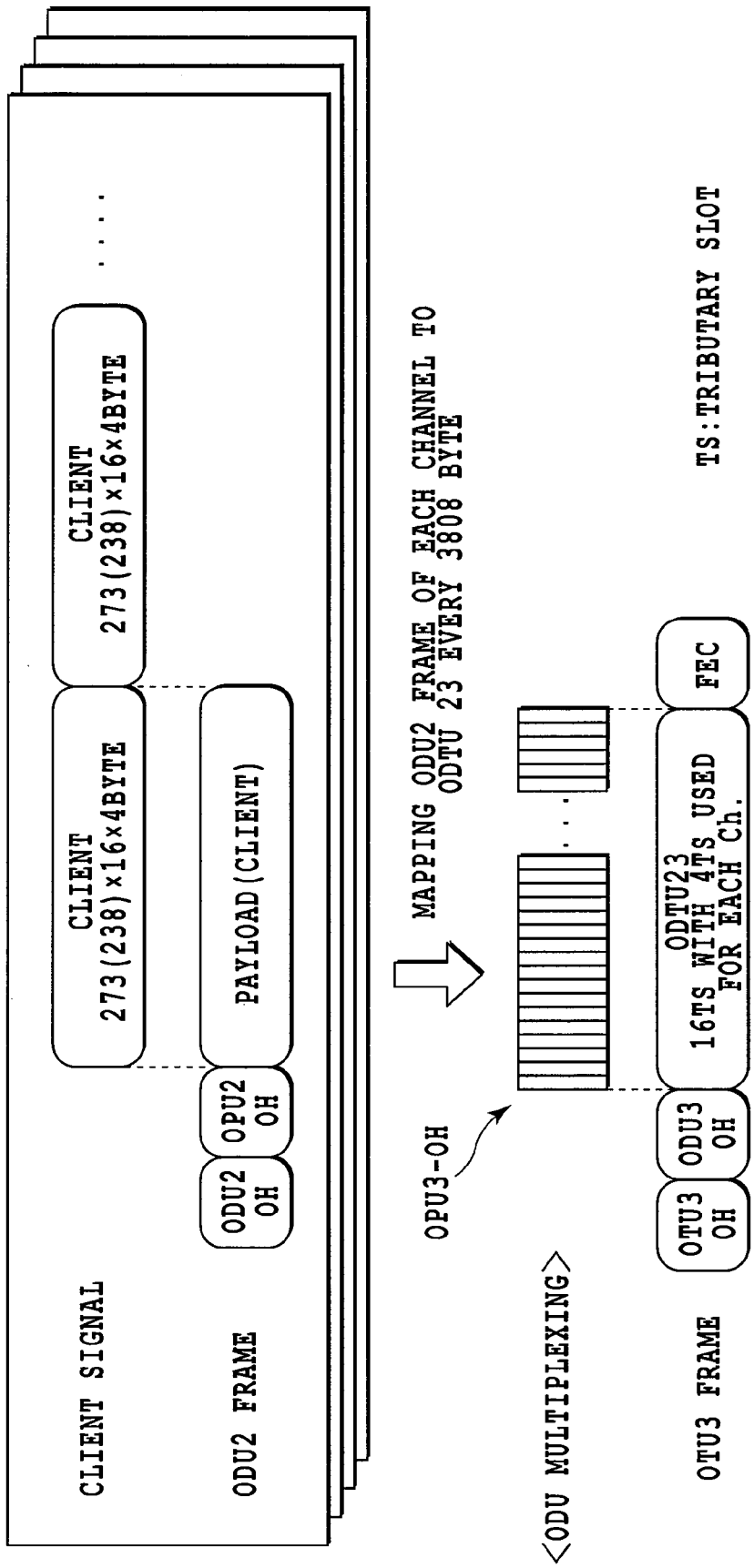
FIG. 5 shows an example of a multiplexed frame structure in the case of ODU multiplexing in accordance with the present invention.

FIG. 5 shows an example of a frame structure in the case of using Justification byte of OPU overhead in the multiplexed layer with different ODU multiplexing in the OTN network. For example, the coordination of the stuffing using Justification byte of OPU2 and OPU3 allows expansion of the client signal frequency range capable of accommodating in the OTN network.

Referring again to FIG. 3, the multiplexed client signal being transmitted from the optical transmitting section 43 of the optical transmitter 4 is received by the optical receiving section 50 of the optical receiver 5 with the new OH2 eliminated by the demultiplexing section 51 and demultiplexed accordingly. Subsequently, the demultiplexed client signal has each new OH1 eliminated by the client signal extracting section 52, with the stuffing information notification bits in the new OH1 being referenced, data extraction and frequency restoration of the client signal being performed by the corresponding destuffing, and the client signal being outputted.

Third Embodiment

Figure 6:
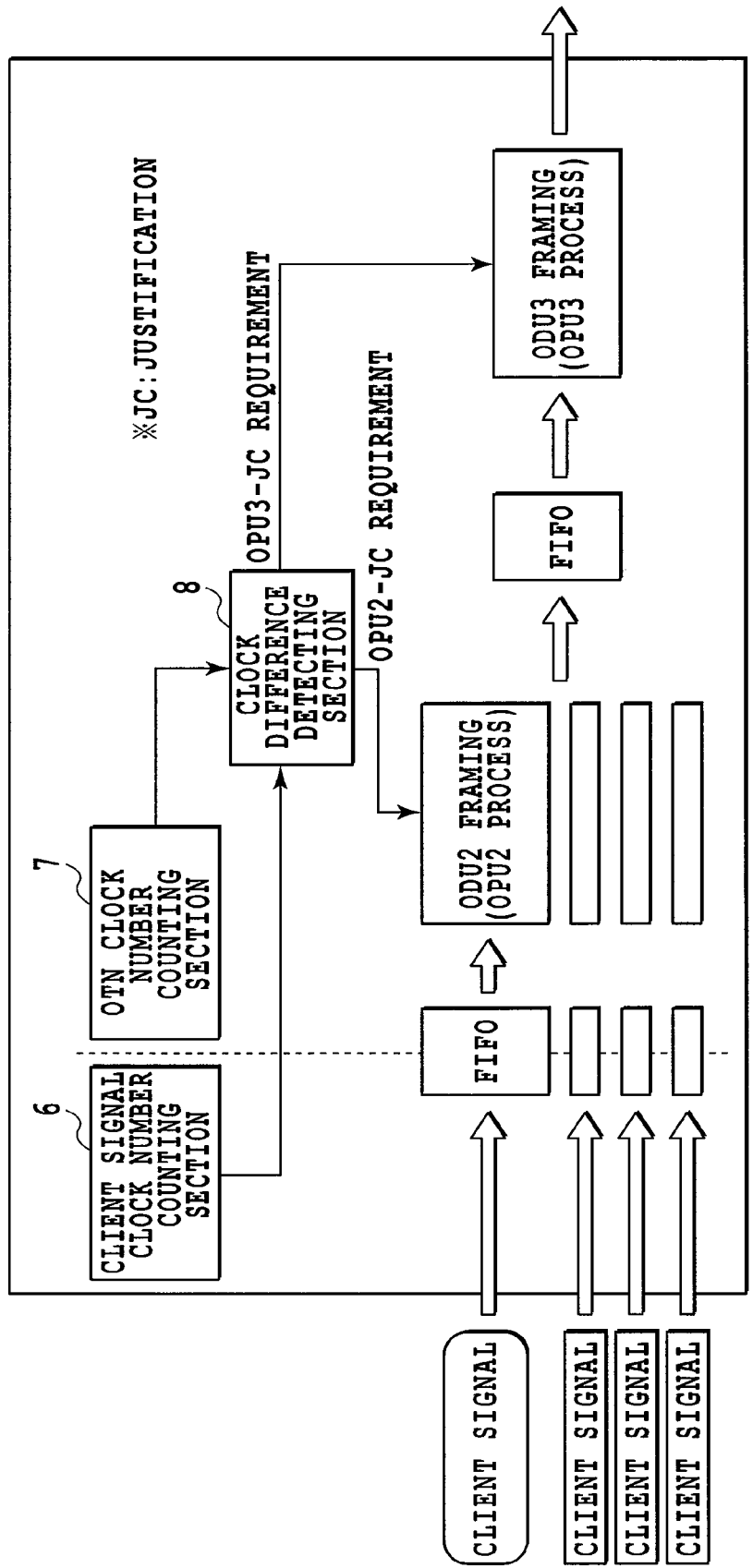
FIG. 6 shows an optical transmitter in accordance with an embodiment of the present invention.

The third embodiment of the present invention will be described with reference to FIG. 6. FIG. 6 shows an optical transmitter in accordance with an embodiment of the present invention. FIG. 6 shows an example of an optical transmitter structure detecting the difference between the client signal side clock frequency and the transmission path side clock frequency, and allocating the stuffing of a plurality of stuffing bits in accordance with the frequency difference, at the time of ODU multiplexing four 10 Gbit/s client signals into 43 Gbit/sOTU3.

The number of client signal clocks and OTN clocks are counted respectively by a client signal clock number counting section 6 and an OTN clock number counting section 7. The stuffing in the OPU2 and the OPU3 are coordinated corresponding to the clock difference detected by a clock difference detecting section 8. The OPU2 process may perform a rough frequency adjustment as an upper side process, and the OPU3 process may perform a fine adjustment of frequencies as a lower side process. For example, when the client signal side clock frequency is higher than the transmission path side clock frequency, the OPU2 process can be configured to perform a rough frequency adjustment periodically, while the OPU3 process can be configured to perform a fine adjustment of frequencies in a shorter period than the period of the OPU2 process. In the case of ODU multiplexing, stuffing may be occurred in the OPU3 process even without any frequency differences. Accordingly, when the OPU3 process is configured to be the lower side process, only the OPU3 process performs stuffing in a small frequency difference range and thereby offers the advantage of simplifying the process. The OPU3 process can be the upper process and the OPU2 can be the lower process.

Fourth Embodiment

Figure 7:
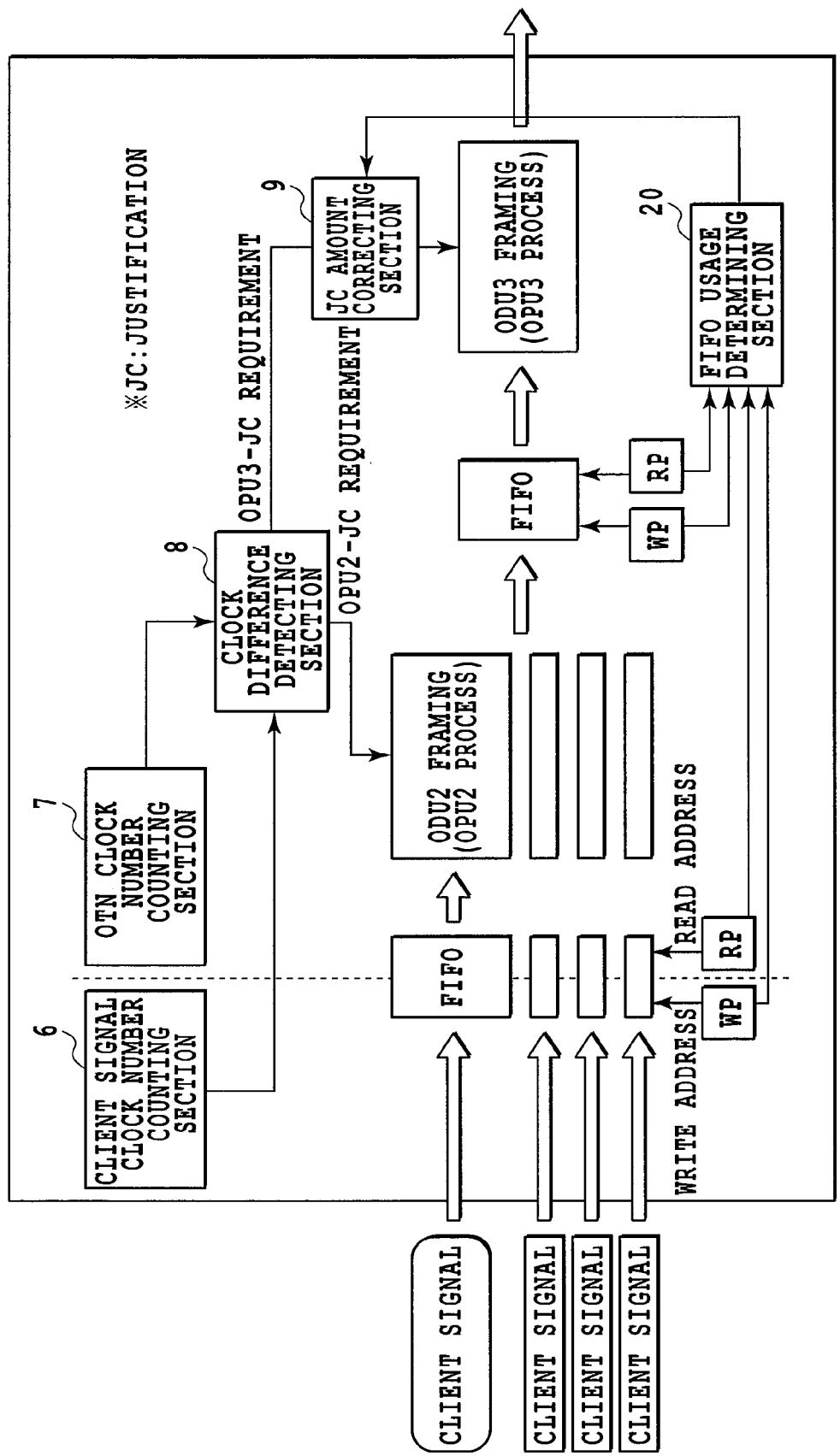
FIG. 7 shows an optical transmitter in accordance with an embodiment of the present invention.

The fourth embodiment of the present invention will be described with reference to FIG. 7. FIG. 7 shows an optical transmitter in accordance with an embodiment of the present invention. The optical transmitter of the embodiment detects the FIFO capacity for transition from the client side clock to the transmission path side clock by a FIFO usage determining section 20. In response to the FIFO capacity being detected, the stuffing is corrected by a JC amount correcting section 9 and an error from the clock frequency difference detection is absorbed. Further, the optical transmitter has a circuit for detecting the clock frequency difference with frequencies corresponding to the division ratio based on a bit rate, together with a circuit for detecting with much smaller frequency (higher frequency) than the division ratio based on the bit rate, in the clock difference detecting section 8. The combination of the frequency difference detection with a plurality of frequencies by using a plurality of these detecting circuits allows for a reduction in detection time while retaining the frequency difference detection accuracy.

Fifth Embodiment

Figure 8:
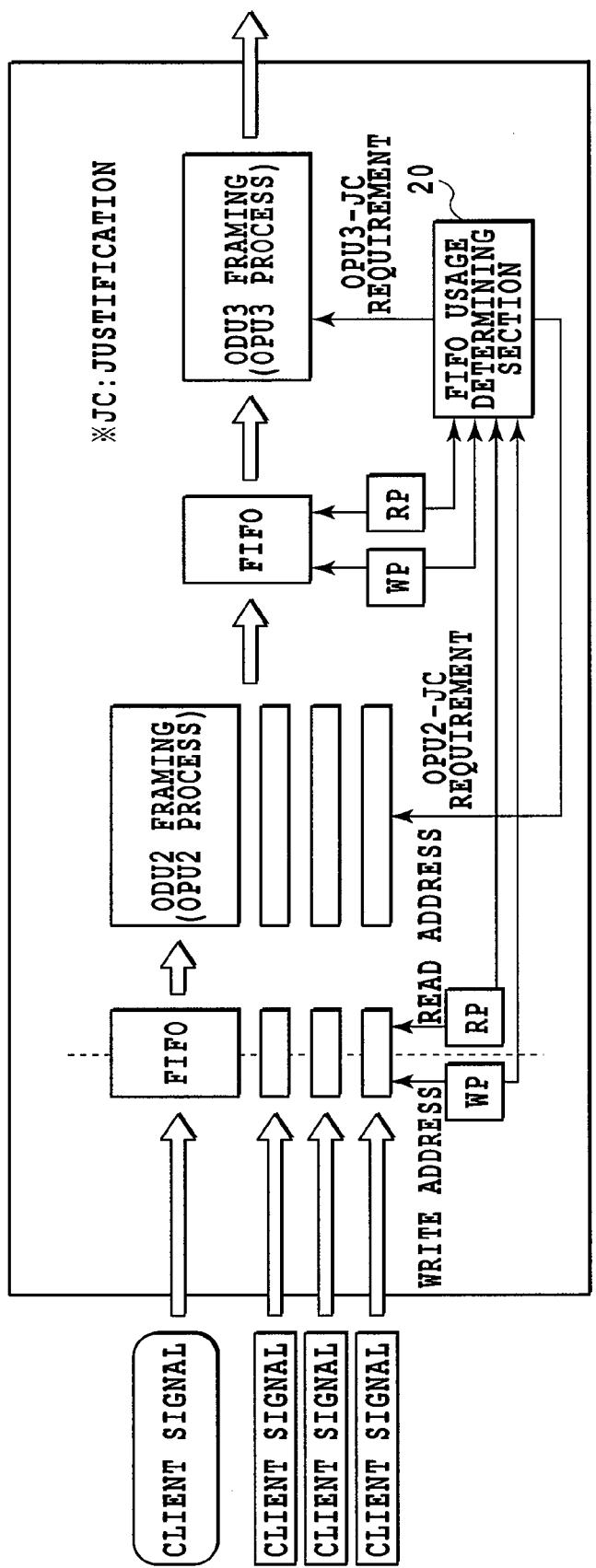
FIG. 8 shows an optical transmitter in accordance with an embodiment of the present invention.

The fifth embodiment of the present invention will be described with reference to FIG. 8. FIG. 8 shows an optical transmitter in accordance with an embodiment of the present invention. The optical transmitter of the embodiment detects the FIFO capacity for transition from the client side clock to the transmission path side clock by a FIFO usage determining section 20, and allocates stuffing of a plurality of stuffing bits corresponding to the FIFO capacity being detected. The optical transmitter of the present embodiment determines the stuffing allocation by the usage of the FIFO which is the circuit essential for the clock transition, thereby the additional circuits such as the client signal clock number counting section 6, the OTN clock number counting section 7, the clock difference detecting section 8, and the JC amount correcting section 9 as shown in FIGS. 6 and 7 can be avoided to facilitate the hardware configuration. The optical transmitter can be configured to treat each multiplexed layer collectively by using only one FIFO. In this case, the stuffing allocation can be determined corresponding to only one FIFO capacity, and thereby the control of the stuffing can be facilitated.

INDUSTRIAL APPLICABILITY

According to the present invention, frequency synchronization is achieved by stabilizing the client signals with low frequency accuracy such as the 10 GbE LAN-PHY, and the transmission thereof is allowed by accommodating/multiplexing without causing a bit slip. Consequently, the clock frequencies tolerable to the client signal can be increased, and the network user's efficiency can be improved.

The invention claimed is:

1. An optical transmitter for accommodating client signals and transmission thereof as an optical signal, the optical transmitter comprising:
   new overhead applying means for adding new overheads and payloads corresponding to the new overheads to the client signals to generate new format signals wherein the new overheads define data storing bits for negative stuffing and stuffing information notification bits, and the payloads contain the client signals and define data storing bits for positive stuffing;
   signal transmitting means for transmitting the new format signals;
   clock frequency difference detecting means for detecting a clock frequency differences between a client side with at least two input client signals and a transmission path side in the optical transmitter by comparing counted numbers of divided clocks between the at least two input client signals and the transmission path side, the clock frequency difference detecting means comprising multiple clock frequency differences detection means for detecting multiple clock frequency differences with different clock division ratios to be used for comparing the counted numbers, wherein the clock frequency difference detection means utilizes the multiple clock frequency differences detection means to detect the clock frequency differences with multiple frequencies; and
   stuff processing means for adjusting the clock frequency difference by utilizing one of the data storing bits for negative stuffing and data storing bits for positive stuffing.

2. The optical transmitter according to claim 1, further comprising:
   FIFO capacity detecting means for detecting a FIFO capacity for transition from a clock of the client side to a clock of the transmission path side; and
   stuff processing correcting means for correcting the stuff processing according to the FIFO capacity.

3. An apparatus comprising:
   an optical transmitter configured to:
      add new overheads and payloads corresponding to the new overheads to at least two client signals to generate new format signals, wherein the new overheads define data storing bits for negative stuffing and stuffing information notification bits, and the payloads contain the client signals and define data storing bits for positive stuffing;

transmit the new format signals;
detect clock frequency differences between the at least two clients signals from a client side and a transmission path side in the optical transmitter by comparing counted numbers of divided clocks between the client side and the transmission path side, wherein the optical transmitter is further configured to detect multiple clock frequency differences with different clock division ratios to be used for comparing the counted numbers and to detect the clock frequency difference with multiple frequencies; and
adjust the clock frequency difference by utilizing one of the data storing bits for negative stuffing and data storing bits for positive stuffing.

* * * * *

UNITED STATES PATENT AND TRADEMARK OFFICE
CERTIFICATE OF CORRECTION

PATENT NO. : 8,135,285 B2
APPLICATION NO. : 12/096551
DATED : March 13, 2012
INVENTOR(S) : Yoshiaki Kisaka et al.

It is certified that error appears in the above-identified patent and that said Letters Patent is hereby corrected as shown below:

Title Page insert additional Assignee information on the title page:

(73) Assignee

-- Nippon Telegraph and Telephone Corporation, Tokyo, Japan;
NTT Electronics Corporation, Yokohama-shi, Kanagawa --

Signed and Sealed this
Thirtieth Day of April, 2013

Teresa Stanek Rea
*Acting Director of the United States Patent and Trademark Office*